United States Patent [19]
Barr

[11] Patent Number: 6,131,645
[45] Date of Patent: Oct. 17, 2000

[54] INDIVIDUALIZED COOLING SYSTEM USED IN A MOTOR VEHICLE

[76] Inventor: Raymond S. Barr, 4924 Valley Ridge, Apt. 2063, Irving, Tex. 75062

[21] Appl. No.: 09/201,989

[22] Filed: Dec. 1, 1998

[51] Int. Cl.[7] .............................. F25D 23/12; B60H 3/04; B60H 1/34; B60H 1/26
[52] U.S. Cl. ........................... 165/41; 165/46; 62/259.3; 62/244; 237/12.3 R; 454/903
[58] Field of Search ............................ 165/46, 41, 80.1; 2/DIG. 1; 62/259.3, 244; 237/12.3 R; 454/903

[56] References Cited

U.S. PATENT DOCUMENTS

| | | | |
|---|---|---|---|
| 2,460,269 | 2/1949 | Appeldoorn | 62/259.3 |
| 4,418,745 | 12/1983 | Roehr | 165/46 |
| 4,457,295 | 7/1984 | Roehr | 165/46 |
| 4,964,282 | 10/1990 | Wagner | 62/259.3 |
| 5,146,757 | 9/1992 | Dearing | 62/259.3 |
| 5,794,683 | 8/1998 | Kutzner | 165/41 |
| 5,921,467 | 7/1999 | Larson | 165/46 |

FOREIGN PATENT DOCUMENTS

| | | | |
|---|---|---|---|
| 0182532 | 7/1980 | Japan | 237/12.3 R |

*Primary Examiner*—John K. Ford
*Attorney, Agent, or Firm*—Harry C. Post, III

[57] ABSTRACT

An individualized system used in a motor vehicle that has a system supplying conditioned air to selectively heat and cool an interior of the motor vehicle. The system comprises tubular apparatus to route a portion of the conditioned air to a chosen location inside the motor vehicle. An input connector places the tubular apparatus in fluid communication with the portion of the conditioned air. An output connector places the tubular apparatus in fluid communication with an interior of clothing worn by an individual positioned at the chosen location inside the motor vehicle to supply the portion of conditioned air to the individual.

10 Claims, 1 Drawing Sheet

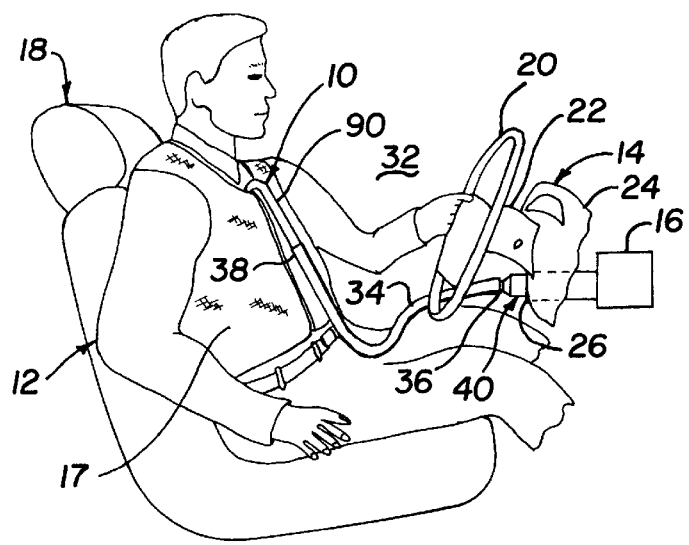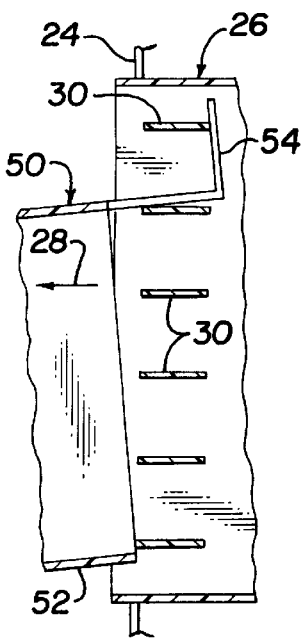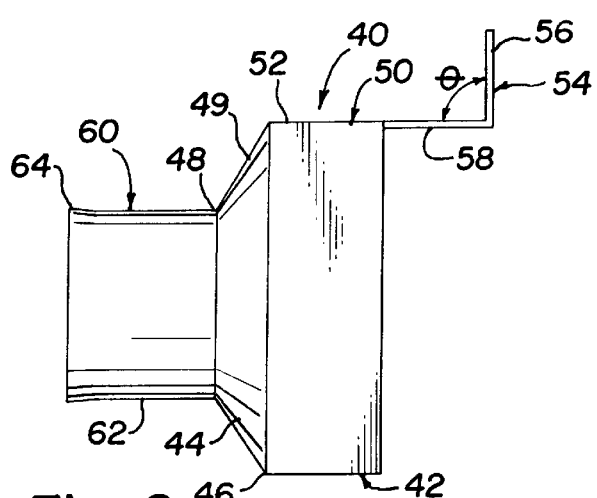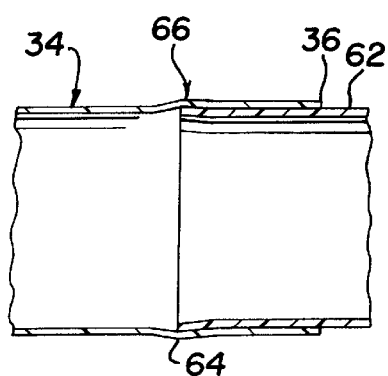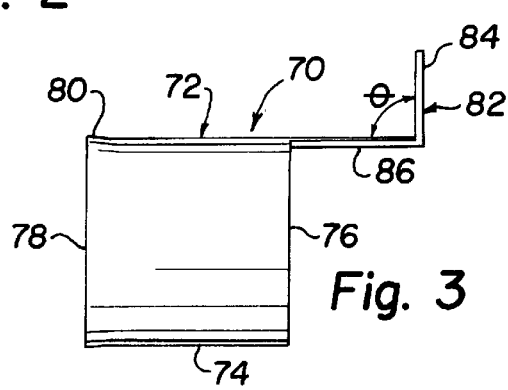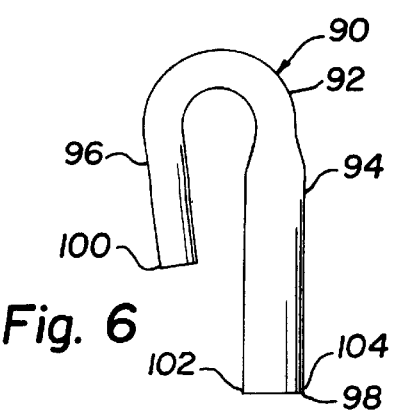

INDIVIDUALIZED COOLING SYSTEM USED IN A MOTOR VEHICLE

BACKGROUND OF THE INVENTION

This invention relates to an individualized or personalized cooling system for an individual in a motor vehicle and, more particularly, an individualized or personalized cooling system for diverting a portion of the air supplied by an air-conditioning system that selectively heats and cools an interior of a motor vehicle.

It is well known that most police motor vehicles are provided with an air-conditioning system that selectively heats and cools the interior of such motor vehicle.

It is also well known that a policeman should and in some cases is required to wear his or her protective vest while in the motor vehicle during duty hours.

During hot weather, such as occurs for extended periods in the southern regions of the United States, officers frequently remove their protective vests while in the motor vehicle to quickly cool themselves. However, when an emergency occurs while an officer is not wearing his or her protective vest and the vest is critically needed, such as when reacting to an alarm during an armed robbery or a sniper incident, the officer may be severely injured and, at the very least, assistance by the officer cannot be rendered rapidly as desired because of the delay caused while he or she is donning the vest.

BRIEF SUMMARY OF THE INVENTION

In accordance with the present invention, there is provided an individualized system used in a motor vehicle that has a system supplying conditioned air to selectively heat and cool an interior of the motor vehicle. The system comprises tubular apparatus to route a portion of the conditioned air to a chosen location inside the motor vehicle. An input connector places the tubular apparatus in fluid communication with the portion of the conditioned air. An output connector places the tubular apparatus in fluid communication with an interior of clothing worn by an individual positioned at the chosen location inside the motor vehicle to supply the portion of conditioned air to the individual.

Further, there is provided an individualized system used in a motor vehicle that has an air-conditioning system to selectively heat and cool an interior of the motor vehicle. The system comprises tubular apparatus for routing a portion of the air being delivered from the air-conditioning system to a chosen location inside the motor vehicle. Attaching apparatus attaches an inlet of the tubular apparatus to the motor vehicle air-conditioning system. Connecting apparatus connects an outlet of the tubular apparatus to clothing worn by an individual in the motor vehicle.

BRIEF DESCRIPTION OF THE SEVERAL VIEWS OF THE DRAWINGS

Objects and advantages of the invention will become apparent upon reading the following detailed description and upon reference to the drawings, wherein like reference characters are used throughout to designate like parts:

FIG. 1 is a perspective view of an individual in the driver's seat of a motor vehicle wearing an individualized system constructed according to the present invention;

FIG. 2 is an enlarged view, in elevation, of a first embodiment of an attaching apparatus that may be used in the system shown in FIG. 1;

FIG. 3 is an enlarged view, in elevation, of a second embodiment of an attaching apparatus that may be used in the system shown in FIG. 1;

FIG. 4 is an enlarged view, in elevation and section, of an attaching mechanism that is used on the embodiments shown in FIGS. 2 and 3;

FIG. 5 is an enlarged view, in elevation and section, of a quick release connecting apparatus that is used on the embodiments shown in FIGS. 2 and 3; and FIG. 6 is an enlarged view, in elevation, of a connecting apparatus used in the system shown in FIG. 1.

DETAILED DESCRIPTION OF THE INVENTION

Turning now to the drawing, there is shown a system 10 providing individualized or personalized heating or cooling to an individual 12, who is driving a motor vehicle 14 that has an air-conditioning system 16 that selectively heats and cools the interior of motor vehicle 14.

As shown in FIG. 1, individual 12 is a police officer wearing a protective vest 17 setting in a driver's seat 18 of motor vehicle 14. As shown, individual 12 is manipulating a steering wheel 20 to drive a conventional police patrol car 14. A column 22 extends from steering wheel 20 beneath or through a dash board 24 to a conventional steering system (not shown) to control the direction of wheels (not shown) of vehicle 14. A conventional air-conditioning outlet or register 26 is mounted in dash board 24 and a portion 28 of the air conditioned by air-conditioning system 16 is directed to a grill, which has louvers 30 or other conventional apparatus, and into an interior 32 of vehicle 14.

As shown, system 10 has a tubular apparatus 34 to route portion 28 of the air being delivered from air-conditioning system 16 to a chosen location (police officer 12) inside motor vehicle 14. Tubular apparatus 34 has a first end 36 forming an inlet, a second end 38 forming an outlet and a length sufficient to allow individual 12 to operate motor vehicle 14 when driving such vehicle. It is preferred that tubular apparatus 34 be constructed from a conventional flexible hose to the hose to be expanded and contracted while vehicle 14 is being operated. Also, it is preferred that tubular apparatus 34 has a circular cross-section with an inside diameter of approximately 1.35 inches.

As best seen in FIGS. 2 and 4, system 10 has an attaching device 40 to attach inlet 38 of tubular apparatus 34 to outlet 26 of air-conditioning system 16. Attaching device 40 has a tubular body 42 with an intermediate portion 44 in the shape of a truncated cone, which is defined by a base rim 46 and an discharge rim 48 interconnected by sidewalls 49.

Attaching device 40 has an inlet end or portion 50 that extends from base rim 46 in a direction away from discharge rim 48. Inlet portion 50 is made from a tube 52 with a diameter substantially the same as the diameter of base rim 46. The diameter of tube 52 and base rim 46 are of a size chosen to receive substantially all of portion 28 of the conditioned air discharged from register 26.

Attaching device 40 has a connecting portion 54 for connecting tube 52 of inlet end or portion 50 to louvers 30 of air-conditioning system 16. Connecting portion 54 has an elongated end portion 56 and an extending portion 58 that interconnects elongated end portion 56 to tube 52. As shown in FIG. 4, elongated end 56 and extending portion 58 have a size and length sufficient for elongated end portion 56 to be passed between louvers 30 of discharge register 26 and engage the back side of louvers 30. Elongated end portion 56 of attaching device 40 is disposed at an angle Θ relative to extending portion 58. It is preferred that angle Θ is disposed at 90° so that elongated end portion 56 and extending portion 58 are disposed substantially transverse to one another.

Attaching device 40 has an outlet end or portion 60 extending from discharge rim 48 in a direction away from base rim 46. Outlet end 60 is adapted to be connected to inlet 36 of tubular apparatus 34. Outlet portion 60 has a tube 62 with an outside diameter of approximately 1.375 inches. As shown in FIG. 4, a shoulder 64 extends outwardly of and annularly around tube 62 and has a diameter of approximately 1.450 inches. The diameter of shoulder 64 is larger than the inside diameter of inlet end 36 to create an interference fit while providing a quick release arrangement 66 that permits separation of tubular apparatus 34 from attaching device 40 when individual 12 must quickly exit motor vehicle 14. The height of shoulder 64 is determined by subtracting the outside diameters of tube 62 from shoulder 64 and dividing by two. An interference fit is proper when tubular apparatus 34 has an inside diameter of approximately 1.35 inches and when shoulder 64 has an outside diameter of approximately 1.450 inches.

A second attaching device 70 is shown in FIG. 3. As with first attaching device 40, second attaching device 70 is used in system 10 to attach inlet 38 of tubular apparatus 34 to outlet 26 of air-conditioning system 16. Second attaching device 70 has a body 72 that is formed from a tube 74 with an inlet end or portion 76 and an outlet end or portion 78.

As with first attaching device 40, outlet end 78 of second attaching device 70 is adapted to be connected to inlet 36 of tubular apparatus 34 and a shoulder 80 extends outwardly of and annularly around tube 74. Shoulder 80 has an outside diameter that is larger than the inside diameter of inlet end 36 of tubular apparatus 34 to create an interference fit and provide a quick release arrangement similar to quick release apparatus 66. Thus, tubular apparatus 34 is separated from second attaching device 70 when individual 12 must quickly exit motor vehicle 14. When tubular apparatus 34 is the same, then tube 74 should have same outside diameter as tube 62 and shoulder 80 should have the same height as shoulder 64 to obtain the same interference fit.

As with first attaching device 40, tube 74 is adapted to be connected to air-conditioning system 16 by a connecting portion 82. Connecting portion 82 has an elongated end portion 84 and an extending portion 86 that interconnects elongated end portion 84 to tube 74. Elongated end 84 and extending portion 86 have a size and length sufficient for elongated end portion 84 to be passed between louvers 30 of discharge register 26 of air-conditioning system 16 and engage the back side of louvers 30. Elongated end portion 84 of attaching device 70 is disposed at an angle Θ relative to extending portion 86 to engage louvers 30. It is preferred that angle Θ is disposed at 90° so that elongated end portion 84 and extending portion 86 are disposed substantially transverse to one another.

A connecting device 90 is used in system 10 to connect outlet 38 of tubular apparatus 34 to clothing 17, which is worn by individual 12 in motor vehicle 14. Connecting device 90 has a generally J-shaped body 92 with a longer portion 94 and a shorter portion 96. An inlet 98 is provided in longer portion 94, which is connected to outlet 38 of tubular apparatus 34. An outlet 100 is provided in shorter portion 96, which is disposed to discharge portion 28 of air into the interior of clothing 17 worn by individual 12.

A tubular connector 102 for detachably connecting device 90 to tubular apparatus 34 is provided on longer portion 94 of connecting device 90. As with the connectors of attaching devices 40 and 70 with inlet 36 of tubular apparatus 34, tubular connector 102 and outlet 38 of tubular apparatus 34 are constructed to form an interference fit permitting separation from one another when individual 12 quickly exits motor vehicle 14. As with quick disconnect apparatus 66, tubular connecter 102 of connecting device 90 has a shoulder 104 extending outwardly of and annularly around a tube 106 formed in longer portion 94 and shoulder 104 has a height chosen to provide the interference fit. Tubular apparatus 34 has the same inside diameter at inlet 36 and outlet 38, and longer portion 94 has the same outside diameter as tube 62 and shoulder 80 has the same height as shoulder 64.

As shown in FIG. 5, the preferred height of shoulders 64, 80 and 104 is the same because the inside diameter of tubular apparatus 34 is the same and the interference fit has been found to be satisfactory.

In operation, after individual 12 sits down in car seat 18 and starts the automobile, he or she attaches connecting device 90 to vest 17 by slipping outlet 100 into the interior of vest 17. The bend of J-shaped body 92 rests against the collar of vest 17 worn by individual 12. Outlet 38 of tubular apparatus 34 is then slipped over shoulder 104 and onto longer portion 94 of J-shaped body 92. Inlet end 36 of tubular apparatus 34 in slipped over shoulder 64 of body 42 and elongated end portion 56 and extending portion 58 are moved between louvers 30 for attachment in register or outlet 26 of air-conditioning system 16 to dash board 24. Thus, attaching device 40 places tubular apparatus 34 in fluid communication with air-conditioning system 16 and connecting device 90 places tubular apparatus 34 in fluid communication with the interior of vest 17 worn by individual 12. As the conditioned air flows through air-conditioning system 16 into interior 32 of vehicle 14, portion 28 of the conditioned air flows through attaching device 40, tubular apparatus 34 and outlet 100 into the interior of vest 17, which provides additional cooling to individual 12. In the event of an emergency, individual 12 stops vehicle 14, slips from under steering wheel 20 and out the door of vehicle 14. While this is happening, tubular apparatus 34 slips from attaching device 40, connecting device 90 or both to effect a quick disconnection. Should tubular apparatus 34 remain connected to connecting device 90, individual 12 can quickly pull tubular apparatus 34 from connecting device 90 or remove both tubular apparatus 34 and connecting device 90 from its connection with vest 17 by lifting J-shaped body 92 from vest 17.

The invention having been described, what is claimed is:

1. An individualized system used in a motor vehicle that has an air-conditioning system to selectively heat and cool an interior of the motor vehicle, comprising: tubular means for routing a portion of the air being delivered from the air-conditioning system to a chosen location inside the motor vehicle; attaching means for attaching an inlet of said tubular means to the motor vehicle air-conditioning system, said attaching means including a body having an inlet end adapted to be connected to the air-conditioning system and an outlet end adapted to be connected to an inlet into said tubular means, the outlet end of said attaching means including a tubular connector adapted to be detachably connected to the inlet into said tubular means, the tubular connector and inlet into said tubular means being constructed to form an interference fit substantially adjacent an outlet of the air conditioning system permitting separation from one another when the individual wearing the clothing quickly exits the motor vehicle; and connecting means for connecting an outlet of said tubular means to clothing worn by an individual in the motor vehicle, said connecting means including a body having an inlet end connected to an outlet from said tubular means and an outlet end disposed to discharge the portion of air into an interior of the clothing worn by the individual, the inlet end of said connecting means having a tubular connector adapted to be detachably connected to the outlet from said tubular means, the tubular connector and outlet from said tubular means being constructed to form an interference fit substantially adjacent the individual permitting separation from one another when the individual wearing the clothing quickly exits the motor vehicle.

2. The system set forth in claim 1, further comprising: said tubular means including a flexible hose for allowing movement when the individual drives the motor vehicle.

3. The system set forth in claim 1, further comprising: the tubular connecter of said connecting means having a shoulder extending outwardly of and annularly around the tubular connector, the shoulder having a height chosen to provide the proper interference fit.

4. The system set forth in claim 1, further comprising: the body of said connecting means having a generally J-shape with longer and shorter portions, the inlet end being the longer portion of the generally J-shaped body of the connecting means and the outlet being the shorter portion of the generally J-shaped body of the connecting means.

5. The system set forth in claim 1 further comprising: the inlet end of said attaching means having a elongated end portion and an extending portion connected to the elongated end portion, the elongated end and extending portions having a size and length sufficient for the elongated end portion to be passed between louvers of a discharge register of the air-conditioning system.

6. The system set forth in claim 5, further comprising: the elongated end portion of said attaching means being disposed at an angle relative to the extending portion to engage the louvers.

7. The system set forth in claim 6, further comprising: the angle of the elongated end portion relative to the extending portion of said attaching means being disposed substantially transverse to one another.

8. The system set forth in claim 1, further comprising: the tubular connector of the outlet end of said attaching means having a shoulder extending outwardly of and annularly around the tubular connector, the shoulder having a height chosen to provide the proper interference fit.

9. The system set forth in claim 1, further comprising: the body of said attaching means having a size and shape to receive substantially all of the portion of conditioned air being discharged from a register of the air-conditioning system into the motor vehicle.

10. An individualized system used in a motor vehicle that has an air-conditioning system to selectively heat and cool an interior of the motor vehicle, comprising: tubular means for routing a portion of the air being delivered from the air-conditioning system to a chosen location inside the motor vehicle, said tubular means including a flexible hose for allowing movement when the individual drives the motor vehicle; attaching means for attaching an inlet of said tubular means to the motor vehicle air-conditioning system, said attaching means including a body having a size and shape to receive substantially all of the portion of conditioned air being discharged from a register of the air-conditioning system into the motor vehicle, an inlet end adapted to be connected to the air-conditioning system and an outlet end adapted to be connected to an inlet into said tubular means, the inlet end of said attaching means having a elongated end portion and an extending portion connected to the elongated end portion, the elongated end and extending portions having a size and length sufficient for the elongated end portion to be passed between louvers of a discharge register of the air-conditioning system, the elongated end portion of said attaching means being disposed at an angle relative to the extending portion to engage the louvers, the angle of the elongated end portion relative to the extending portion of said attaching means being disposed substantially transverse to one another, the outlet end of said attaching means including a tubular connector adapted to be detachably connected to the inlet of said tubular means, the tubular connector and inlet of said tubular means being constructed to form an interference fit permitting separation from one another when the individual wearing the clothing quickly exits the motor vehicle, the tubular connecter of the outlet end of said attaching means having a shoulder extending outwardly of and annularly around the tubular connector, the shoulder having a height chosen to provide the proper interference fit; and connecting means for connecting an outlet of said tubular means to clothing worn by an individual in the motor vehicle, said connecting means including a body having a generally J-shape with longer and shorter portions, an inlet end connected to an outlet of said tubular means and an outlet end disposed to discharge the portion of air into an interior of the clothing worn by the individual, the inlet end being the longer portion of the generally J-shaped body and the outlet being into the shorter portion of the generally J-shaped body, the inlet end of said connecting means having a tubular connector adapted to be detachably connected to the outlet of said tubular means, the tubular connector and outlet of said tubular means being constructed to form an interference fit permitting separation from one another when the individual wearing the clothing quickly exits the motor vehicle, the tubular connecter of said connecting means having a shoulder extending outwardly of and annularly around the tubular connector, the shoulder having a height chosen to provide the proper interference fit.

* * * * *